R. D. McMANIGAL.

DRAFT AIR HEATING SYSTEM FOR FURNACES.

APPLICATION FILED JAN. 21, 1918.

Reissued June 4, 1918.

14,480.

2 SHEETS—SHEET 1.

Inventor
Robert D. McManigal

By his Attorney
H. J. Burchard

R. D. McMANIGAL.

DRAFT AIR HEATING SYSTEM FOR FURNACES.

APPLICATION FILED JAN. 21, 1918.

Reissued June 4, 1918.

14,480.

2 SHEETS—SHEET 2.

Inventor

Robert D. McManigal

By his Attorney

H. J. Bernhard

UNITED STATES PATENT OFFICE.

ROBERT D. McMANIGAL, OF LOGAN, OHIO, ASSIGNOR TO THE McMANIGAL GRATELESS FURNACE COMPANY, OF COLUMBUS, OHIO, A CORPORATION OF OHIO.

DRAFT-AIR-HEATING SYSTEM FOR FURNACES.

14,480. Specification of Reissued Letters Patent. Reissued June 4, 1918.

Original No. 1,146,188, dated July 13, 1915, Serial No. 860,059, filed September 3, 1914. Application for reissue filed January 21, 1918. Serial No. 212,982.

*To all whom it may concern:*

Be it known that I, ROBERT D. McMANIGAL, a citizen of the United States, residing at Logan, in the county of Hocking and State of Ohio, have invented certain new and useful Improvements in Draft-Air-Heating Systems for Furnaces; and I do declare the following to be a full, clear, and exact description of the invention, such as will enable others skilled in the art to which it appertains to make and use the same.

My invention relates to improvements in furnaces, and, more particularly, to those of the type known as kilns for burning plastic material.

The main object of the invention is to provide a system whereby the draft air for the furnace may be preheated by utilizing the waste heat radiating from the furnace, thereby employing this waste heat to aid combustion.

A further object of the invention lies in providing simple construction whereby the system may be applied to brick kilns.

With the above and other objects in view, the invention resides in certain novel features of construction and combination herein described and claimed and shown in the drawings wherein:

Figure 1:
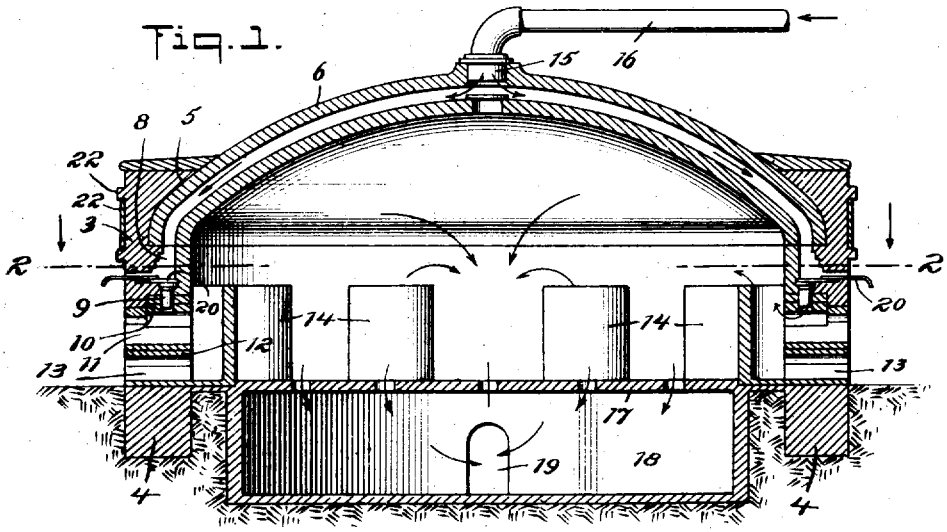
Figure 1 is a vertical transverse section through a brick kiln constructed in accordance with my invention.
Figure 2:
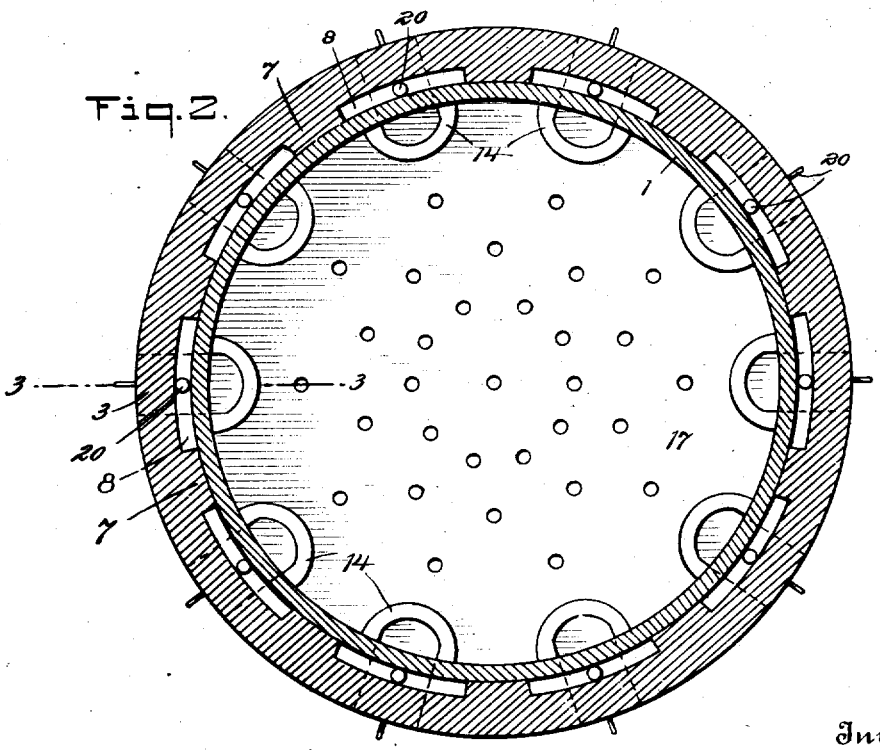
Fig. 2 is a horizontal section taken on the line 2—2 of Fig. 1.
Figure 3:
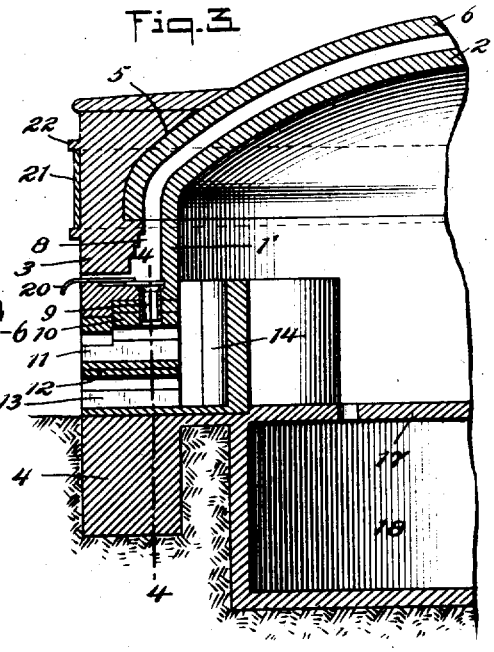
Fig. 3 is a detail vertical section taken on the line 3—3 of Fig. 2.

In the accompanying drawings, from Figs. 1 to 4 inclusive, the numeral 1 designates an inner circular wall which supports, upon its upper end, a solid dome or crown 2, while the numeral 3 designates an outer wall which is spaced from the inner wall 1 at its upper portion as clearly seen in Fig. 2, while the lower portions of said walls are united to form an integral structure as seen at 4 in Figs. 1 and 3. The wall 3 rises a considerable distance above wall 1 and is provided with an internal annular groove 5 which receives the outer edge of a supplemental crown 6 which is spaced from the crown 2 a distance equal to the space between the upper end portions of the walls 1 and 3. As more clearly seen in Fig. 2, the wall is formed with a plurality of upright ribs 7 which contact with the wall 1, thereby forming a number of air passages 8 whose upper ends communicate with the space between the two crowns while their lower ends communicate with upright tubes or pipes 9 which project through arches 10 of fuel openings 11 which are formed through the united portion of the walls 1 and 3, horizontal partitions 12 being located beneath the openings 11 whereby to provide passages 13 through which ashes may be removed from a plurality of internal fire boxes 14 with which said passages 11 and 13 communicate.

The supplemental crown 6 is provided with a fresh air inlet 15 through which air, under pressure, is forced through a pipe 16, said air being heated within the heating compartment formed between the spaced crowns 2 and 6 and being then fed downwardly through the passages 8 and tubes 9 into the air passages 11 from which said heated air will then be discharged into the fire boxes 14, thereby aiding combustion within said fire boxes, the smoke and spent gases being then discharged through the usual perforated bottom 17 into a smoke pit which is provided with one or more outlets 19 which lead to a smoke stack (not shown). The amount of heated air fed to the fire boxes 14 may be regulated by the provision of a plurality of dampers 20 designed to close and open the upper ends of the tubes 9.

For the purpose of imparting rigidity to the structure above described, the upper end of the wall 3 is surrounded by a continuous metal band 21 which is here shown as located between upper and lower ribs 22.

Figure 5:
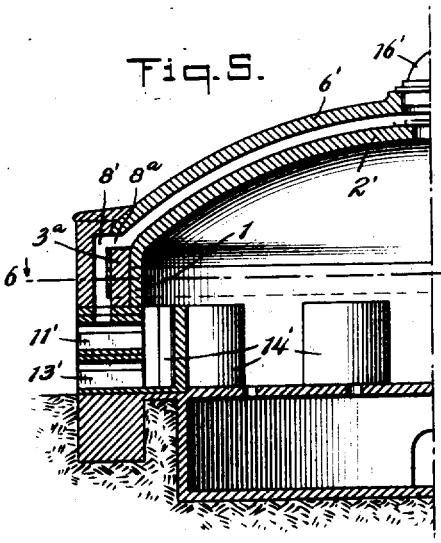
Fig. 5 is a vertical transverse section through one-half of a kiln of ordinary construction, showing the manner in which the preheating system may be applied thereto without unnecessary alterations.
Figure 6:
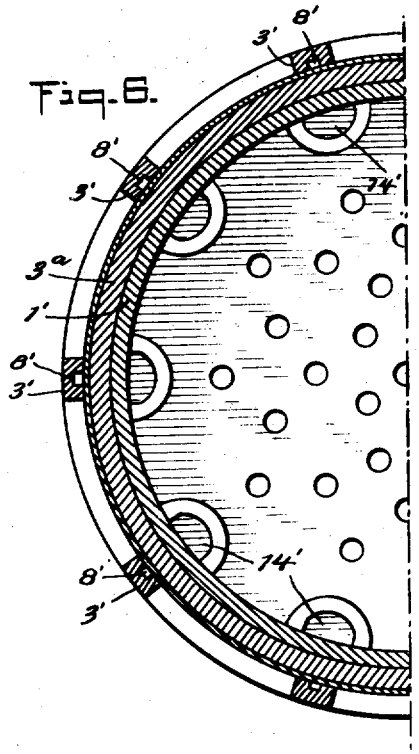
Fig. 6 is a horizontal section as seen on the line 6—6 of Fig. 5.
Figure 4:
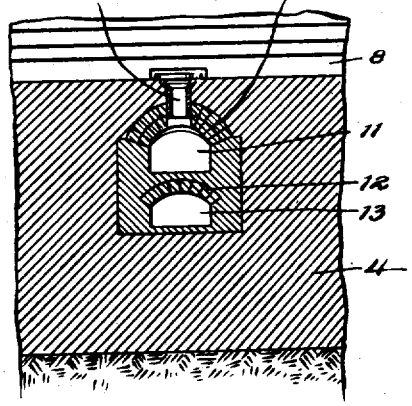
Fig. 4 is a similar view as seen on the line 4—4 of Fig. 3.

In the form of the invention illustrated in Figs. 5 and 6 the numeral 1′ designates an upright inner wall, 2′ the crown or dome thereof, 11′ and 13′ designate respectively the fuel and ash openings, while 3′ identifies a number of independent upright posts or pillars which are built upon the exterior of an outer wall 3ª which surrounds the wall 1′, the posts 3′ being grooved on their inner faces to provide upright air passages 8′ whose lower ends communicate directly with the openings 11′ while their upper ends are turned inwardly and register with openings 8ª formed in the edge of a supplemental crown 6′ which is spaced from the crown 2′, an air pressure pipe 16′ being provided for forcing air into the space between the crowns 2′ and 6′ whereby said air may be heated and then fed to the fire boxes 14′, through the passages 8′ and 11′. It will be understood that this form of the device operates in the same manner as that previously described and that the effect is the same. The last described structure, however, is preferably employed for equipping an old kiln with the improvements.

From the foregoing description taken in connection with the accompanying drawings, it will be seen that extremely simple and efficient means have been provided for preheating the draft air of the furnaces and for feeding the same into the fire boxes.

I may here explain that I am aware that numerous other devices have been employed which, at a glance, resemble the construction illustrated in the accompanying drawings and described above. Careful inspection, however, discloses the fact that the space between the inner and outer crowns, in these devices, is not designed for heating the draft air but merely constitutes a supplemental heating jacket for preventing excessive escape of heat from the kiln or that these spaces merely constitute smoke passages through which the smoke from the interior of the kiln is discharged. Furthermore, the above mentioned devices which may be identified by the following Patent Numbers, 95,339; 524,390 and 85,813, do not show spaced crowns, a fresh air inlet into the space between said crowns and heated air outlets from said space into the interior of the furnace.

In addition to the functions hereinbefore specified, my invention secures other important advantages and functions as follows:—

The air is taken from the outside atmosphere and supplied under pressure to the chamber between the two crowns, both of which are imperforate or solid, except for the air inlet 15 at the center of the outer crown, as a result of which the air is unmixed with gases taken either from the stack or the kiln, the presence of which gases in the preheated air always results in discoloration when brought into contact with clay goods under treatment within the kiln. By using an inside imperforate crown, the gases within the kiln are precluded from passing into the air space or chamber between the two crowns, such gases from the interior of the kiln being discharged through the flues and ducts in the floor of said kiln.

It is well known that there is a substantial loss of heat in down-draft kilns, due to the radiation of heat from the crown and walls of said kiln, and of this lost radiated heat a large proportion is radiated from the crown of the kiln owing to the fact that the heat from the series of fire boxes is discharged upwardly from the fire bags and toward or into contact with the crown of the kiln. According to this invention, the heat ordinarily lost by radiation is utilized for preheating atmospheric air which is supplied to the series of fire boxes, and thence flows through the fire bags into the kiln chamber. As showing the economy of operation, it may be stated that atmospheric air at a temperature of 70° Fahr. can be and is preheated to a temperature varying from 700 to 800 degrees Fahr. by utilizing the heat radiated from the inner crown of the kiln, which preheated air is fed through down-draft flues directly into the required number of fire boxes, as a result of which operations material economy in the consumption of fuel is rendered possible, for the reason that the preheated air flows through the fire boxes so as to obtain a more efficient combustion, and such air is further heated within such fire boxes so as to be raised to the required high temperature, flowing thence through the fire bags and into the kiln chamber, the air so preheated and subsequently reheated being supplied in a condition which precludes discoloration of the clay goods under treatment within the kiln chamber.

According to this invention, provision is made for preheating the large volume of atmospheric air required to be supplied to the series of fire boxes with which the kiln is equipped. The inner dome or crown of the kiln presents a heating surface of large area, and such inner crown or dome becomes heated to a high temperature by the gaseous products of combustion fed to the kiln chamber from the series of fire boxes, the hottest gaseous products from the fire boxes being discharged through the fire bags directly toward the inner crown before circulating downwardly into contact with the clay goods. Advantage is taken of this high temperature of the inner crown or dome for preheating atmospheric air by covering said inner crown or dome with an outer crown or dome in such manner as to produce between the two crowns or domes the air space or chamber the depth of which is relatively shallow, so that atmospheric air is conducted into direct contact with the surface of the highly heated inner crown or dome. Such air space or chamber is co-extensive, for practical purposes, with the area of the inner dome or crown; and as the intervening chamber or space is of relatively large capacity, and as the air flowing through it is brought into direct contact with the surface of the highly heated inner crown or dome, it is apparent that air in large volume will be preheated to a relatively high temperature, and flow through the series of down-draft flues to the fire boxes, such preheated air flowing through the fire boxes so as to render the combustion more efficient therein and to become reheated to the relatively high temperature required of the heat to be supplied to the kiln chamber.

The external crown or dome, in addition to producing with the inner crown or dome the chamber or space for preheating air, secures other functions, chief among which are that it affords means for protecting such inner crown or dome from weather conditions, and, further, that it contributes in a measure to a reduction in the temperature of the inner crown so as to preclude overheating thereof. Experience shows that single dome kilns when operating on high heats are liable to serious damage by a heavy snow or rainfall, but this is not the case in my double crown kiln, for the reasons that the outer crown or dome affords a protection to the highly heated inner crown against the accession of rain or snow, and, further, that the circulation of air to be preheated between the two crowns precludes overheating of the inner crown and keeps the outer crown at a relatively low temperature, it being apparent that the large percentage of heat radiated from the inner crown or dome becomes absorbed in or is taken up by the atmospheric air which is blown through the intervening space or chamber from the centrally located air inlet at the apex of the outer crown, such circulation of cold atmospheric air tending to reduce the temperature of the inner crown or dome and operating also to reduce the tranmission of heat to the outer crown or dome.

Having thus described my invention, what I declare as new and desire to secure by Letters Patent is:

1. The combination with a furnace comprising an upright continuous wall, a plurality of fire boxes adjacent the interior of said wall, a smoke outlet from the furnace, and a main crown supported by said wall, of a supplemental crown spaced above the main crown, a fresh air inlet into the space between the two crowns, and a plurality of hot air outlets leading from said space to said fire boxes.

2. The combination with a furnace comprising an upright continuous wall, a plurality of fire boxes adjacent the inner side of said wall, said fire boxes having air inlet openings through said wall, a smoke outlet from the furnace, and a main crown supported by said wall, of a supplemental crown spaced above the main crown, a fresh air inlet into the space between the two crowns, and a plurality of hot air outlets leading from said space to said air inlets of the fire boxes.

3. A furnace comprising an inner continuous wall having a plurality of radial air inlets formed through its lower portion, a plurality of fire boxes within said inner continuous wall, one fire box being provided adjacent each air inlet, an outer wall surrounding the inner wall and having a plurality of upright grooves formed in its inner face whereby to provide hot air passages, one of said hot air passages being provided above each of said air inlets, other hot air passages establishing communication between the first named passages and said air inlets, inner and outer crowns spaced one from the other and supported by said inner and outer walls, a fresh air inlet into the space between said crowns and a smoke outlet from the bottom of the furnace.

4. In a structure of the class described, the combination with an imperforate crown extending over the main furnace chamber and a plurality of fire boxes, of an outer crown spaced from said imperforate crown and producing therewith an intermediate chamber, a fresh air inlet to said chamber intermediate said crowns, and a plurality of separate hot air outlets for distributing preheated air from said chamber to said fire boxes individually, said hot air outlets leading substantially from the marginal portion of the intermediate chamber.

5. In a structure of the class described, the combination with an imperforate crown positioned over the main furnace chamber so as to be exposed to the direct action of the heat circulating therein, and a plurality of fire boxes connected with said main furnace chamber, of a second crown spaced relatively to the imperforate crown and producing therewith an intermediate chamber the cross sectional area of which is equal at least to the area of the heating surface presented by said imperforate crown, means for feeding atmospheric air to the chamber intermediate said crowns, whereby atmospheric air is caused to flow within said chamber and into contact with the surfaces of said crowns so as to be preheated thereby, and means connecting said fire boxes with said intermediate chamber for distributing the preheated air to said fire boxes.

6. In a structure of the class described, the combination with a substantially imperforate crown positioned over the main furnace chamber so as to be exposed to the direct action of heat flowing therein, and a plurality of fire boxes, of a second crown spaced relatively to said imperforate crown and producing therewith a relatively shallow chamber intermediate said crowns, the only inlet to said shallow intermediate chamber being an intake for fresh atmospheric air adapted to flow within the chamber and into contact with the heated surfaces afforded by the inner crown thereof, and means for distributing air preheated within said intermediate chamber to each of said fire boxes.

7. In a structure of the class described, the combination with a substantially imperforate crown positioned over the main furnace chamber so as to be exposed to the action of heat flowing therein, and a plurality of fire boxes, of a second crown spaced relatively to said imperforate crown and producing a chamber extending intermediate the crowns, means for feeding atmospheric air to said intermediate chamber whereby atmospheric air flows within said chamber and becomes preheated to the exclusion of furnace gases and by absorption of heat radiated from the surface of the imperforate crown, and means for distributing to each of said fire boxes the atmospheric air preheated within said intermediate chamber.

8. In a structure of the class described, the combination with a substantially imperforate crown positioned over the main furnace chamber so as to be exposed to the action of heat flowing therein, and a plurality of fire boxes in communication with said main furnace chamber, of a second crown positioned over said imperforate crown and affording protection thereto from the action of the weather, said crowns being relatively spaced to produce an intermediate chamber the only inlet to which is an intake for atmospheric air, whereby air free from admixture with furnace gas is free to flow within the intermediate chamber and to absorb heat radiated from said imperforate crown, and means for distributing to each of said fire boxes the air preheated within said intermediate chamber.

9. In a structure of the class described, the combination with an imperforate crown positioned over the main furnace chamber so as to be exposed to the action of heat flowing therein, and a plurality of fire boxes in communication with said main furnace chamber, of a second crown spaced relatively to said first crown and producing therewith an intermediate chamber the only inlet to which is an intake for fresh atmospheric air positioned substantially centrally with respect to said intermediate chamber, and means extending from the marginal portion of said intermediate chamber for feeding to each of the fire boxes atmospheric air preheated within said intermediate chamber.

10. In a structure of the class described, the combination with a substantially imperforate crown positioned over the main furnace chamber so as to be exposed to the action of heat flowing therein, and a plurality of fire boxes in communication with said main furnace chamber, of a second crown spaced relatively to said imperforate crown and producing therewith an intermediate chamber, an inlet for atmospheric air to said intermediate chamber, said inlet being positioned substantially centrally of said intermediate chamber, and a plurality of flues extending beyond the marginal portion of said intermediate chamber and connected with said fire boxes for feeding thereto air preheated by flowing through said intermediate chamber.

11. In a structure of the class described, the combination with a substantially imperforate crown positioned over the main furnace chamber so as to be exposed to the action of heat flowing therein, and a plurality of fire boxes in communication with said main furnace chamber, of a second crown spaced relatively to the imperforate crown and producing therewith a relatively shallow intermediate chamber, means for feeding atmospheric air to said intermediate chamber substantially centrally thereof whereby air unmixed with furnace gases is introduced within said intermediate chamber for contact with a highly heated surface afforded by the imperforate crown, and a plurality of flues extending beyond the marginal portion of said intermediate chamber for distributing air preheated therein to said fire boxes.

In testimony whereof I have hereunto set my hand in the presence of two subscribing witnesses.

ROBERT D. McMANIGAL.

Witnesses:

JOHN F. WHITE,
NEIL W. McMANIGAL.

Copies of this patent may be obtained for five cents each, by addressing the "Commissioner of Patents, Washington, D. C."